United States Patent
Yu et al.

(10) Patent No.: US 12,380,120 B2
(45) Date of Patent: Aug. 5, 2025

(54) IN-CONTEXT AND SEMANTIC-AWARE ENSEMBLE MODEL FOR DOCUMENT RETRIEVAL

(71) Applicant: ADOBE INC., San Jose, CA (US)

(72) Inventors: Tong Yu, Fremont, CA (US); Xiang Chen, Palo Alto, CA (US); Victor Soares Bursztyn, Mountain View, CA (US); Uttaran Bhattacharya, Sunnyvale, CA (US); Eunyee Koh, Sunnyvale, CA (US); Saayan Mitra, San Jose, CA (US); Alexandru Ionut Hodorogea, San Francisco, CA (US); Kenneth Russell, Mountain View, CA (US); Saurabh Tripathy, Hayward, CA (US); Manas Garg, Fremont, CA (US)

(73) Assignee: ADOBE INC., San Jose, CA (US)

( * ) Notice: Subject to any disclaimer, the term of this patent is extended or adjusted under 35 U.S.C. 154(b) by 0 days.

(21) Appl. No.: 18/504,256

(22) Filed: Nov. 8, 2023

(65) Prior Publication Data
US 2025/0147973 A1  May 8, 2025

(51) Int. Cl.
G06F 16/00 (2019.01)
G06F 16/2457 (2019.01)
G06F 16/334 (2025.01)
G06F 16/93 (2019.01)
G06F 16/951 (2019.01)
G06N 20/20 (2019.01)

(52) U.S. Cl.
CPC .... G06F 16/24578 (2019.01); G06F 16/3347 (2019.01); G06F 16/93 (2019.01); G06F 16/951 (2019.01); G06N 20/20 (2019.01)

(58) Field of Classification Search
CPC .. G06F 16/24578; G06F 16/93; G06F 16/951; G06F 16/3347
USPC .......................................................... 707/723
See application file for complete search history.

(56) References Cited

U.S. PATENT DOCUMENTS

| 11,971,914 | B1* | 4/2024 | Watson | G06F 16/31 |
| 2003/0217052 | A1* | 11/2003 | Rubenczyk | G06F 16/951 |
| 2024/0395042 | A1* | 11/2024 | Boiarov | G06V 20/49 |

OTHER PUBLICATIONS

1Reimers,et al., "Sentence-BERT: Sentence Embeddings using Siamese BERT-Networks", arXiv preprint arXiv:1908.10084v1 [cs.CL] Aug. 27, 2019, 11 pages.
2Chung, et al., "Scaling Instruction-Finetuned Language Models", arXiv preprint arXiv:2210.11416v5 [cs.LG] Dec. 6, 2022, 54 pages.

* cited by examiner

*Primary Examiner* — Chelcie L Daye
(74) *Attorney, Agent, or Firm* — F. CHAU & ASSOCIATES, LLC

(57) ABSTRACT

A method, apparatus, non-transitory computer readable medium, and system for document retrieval include obtaining a query and a document. A prompt generator generates a prompt for a reasoning model based on the query and the document. The reasoning model generates a reasoning result based on the prompt. In some cases, the reasoning result indicates that the document answers the query. A machine learning model provides the document in response to the query based on the reasoning result.

14 Claims, 11 Drawing Sheets

| Models | Percentage of questions where score 3 document is in top K predictions | | | | | MRR |
|---|---|---|---|---|---|---|
| | K=1 | K=2 | K=3 | K=4 | K=5 | |
| Semantic Search Model (without Fine-tuning) | 46.325% | 64.816% | 74.895% | 83.038% | 86.168% | 0.633 |
| Semantic Search Model (with Fine-tuning) | 63.430% | 76.418% | 83.800% | 88.758% | 92.404% | 0.753 |
| Reasoning Model | 58.193% | 73.307% | 78.067% | 85.685% | 89.840% | 0.714 |
| Reasoning Model and Semantic Search Model (with Fine-tuning) | 67.992% | 79.054% | 84.070% | 90.128% | 92.726% | 0.782 |
| Reasoning Model and Semantic Search Model (with Fine-tuning) and Rule-Based Model | 69.589% | 83.717% | 87.755% | 93.262% | 95.583% | 0.804 |

FIG. 10

IN-CONTEXT AND SEMANTIC-AWARE ENSEMBLE MODEL FOR DOCUMENT RETRIEVAL

BACKGROUND

The following relates generally to document retrieval, and more specifically to document retrieval using machine learning. Document retrieval refers to the use of a computer to retrieve relevant documents from a collection of, for example, text-based documents in a database, in response to a user query. In some cases, document retrieval can be used in various applications, such as search engines, recommendation systems, and information retrieval systems.

In some cases, a machine learning model is used in document retrieval. For example, when a query (e.g., a user query) is provided to the machine learning model, the machine learning model retrieves documents that are semantically similar to the query. The retrieved documents are displayed in response to the query.

SUMMARY

Aspects of the present disclosure provide methods, non-transitory computer readable media, apparatuses, and systems for document retrieval. According to an aspect of the present disclosure, a semantic search model generates a document based on a query (e.g., user query). In some examples, the document is semantically similar to the query. In one aspect, a reasoning model receives a prompt and the document to generate a reasoning result. In one aspect, an ensemble model receives the document from the semantic search model and the reasoning result from the reasoning model to retrieve a document. In some embodiments, the ensemble model receives a rule-based result generated from a rule-based model to retrieve the document.

A method, apparatus, non-transitory computer readable medium, and system for document retrieval are described. One or more aspects of the method, apparatus, non-transitory computer readable medium, and system include obtaining a query and a document; generating, using a prompt generator, a prompt for a reasoning model based on the query and the document; generating, using the reasoning model, a reasoning result based on the prompt, wherein the reasoning result indicates that the document answers the query; and providing the document in response to the query based on the reasoning result.

A method, apparatus, non-transitory computer readable medium, and system for document retrieval are described. One or more aspects of the method, apparatus, non-transitory computer readable medium, and system include obtaining training data including a prompt, document, and a ground-truth reasoning result that indicates whether the document answers a query indicated by the prompt; initializing a reasoning model; generating, using the reasoning model, a predicted reasoning result that indicates whether the document answers the query; and training the reasoning model based on the predicted reasoning result and the ground-truth reasoning result.

An apparatus, system, and method for document retrieval are described. One or more aspects of the apparatus, system, and method include at least one processor; at least one memory including instructions executable by the at least one processor; a prompt generator comprising parameters stored in the at least one memory, wherein the prompt generator is trained to generate a prompt based on a query and a document; and a reasoning model comprising parameters stored in the at least one memory, wherein the reasoning model is trained to output a reasoning result based on the prompt.

BRIEF DESCRIPTION OF THE DRAWINGS

FIG. 10 shows an example of an evaluation based on the machine learning model according to aspects of the present disclosure.

DETAILED DESCRIPTION

Figure 1:
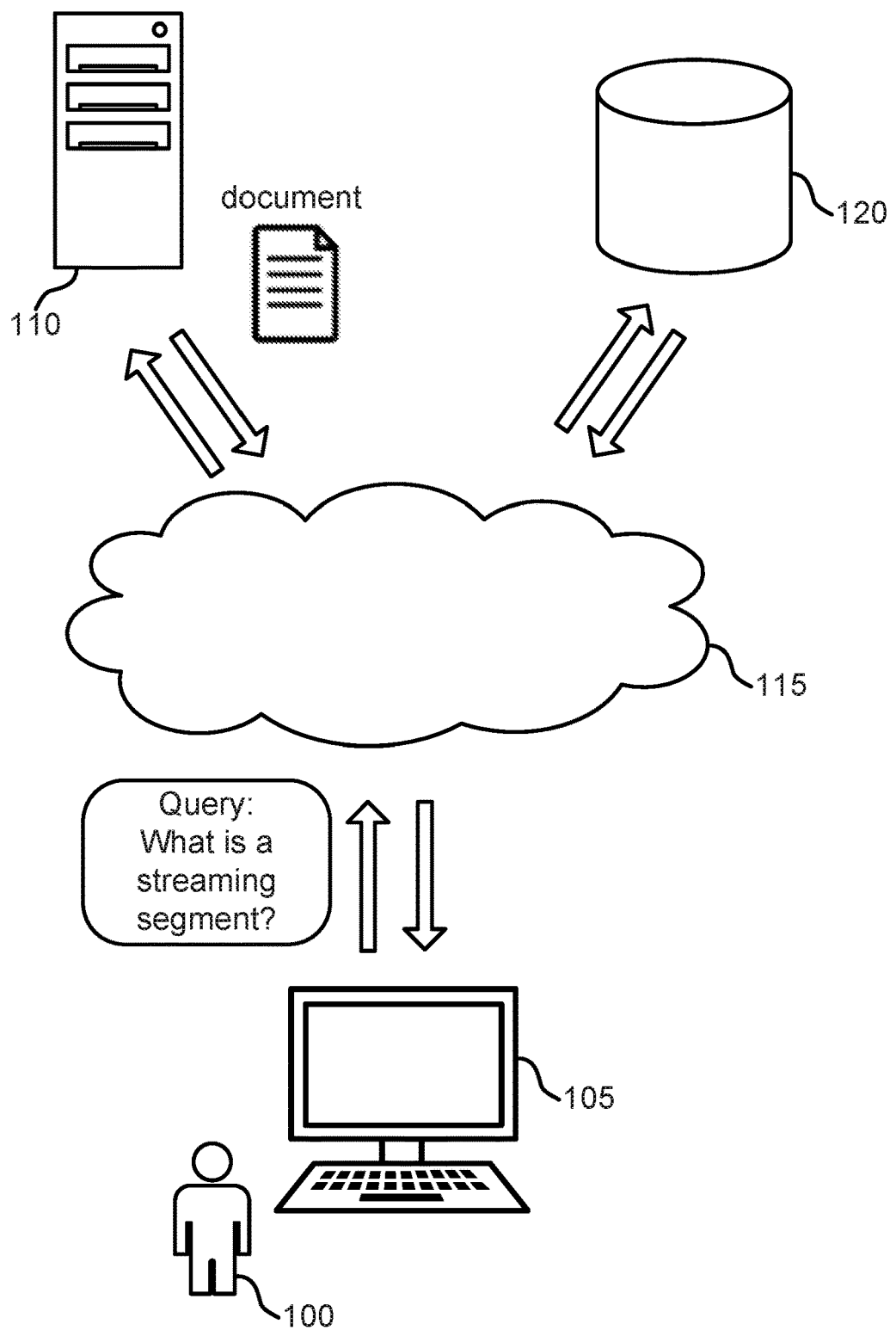
FIG. 1 shows an example of a document retrieval system according to aspects of the present disclosure.

Aspects of the present disclosure provide methods, non-transitory computer readable media, apparatuses, and systems for document retrieval. According to an aspect of the present disclosure, a semantic search model generates a ranking based on a query (e.g., user query). In some examples, the ranking result includes a document semantically similar to the query. In one aspect, a reasoning model receives a prompt and the document to generate a reasoning result. In one aspect, an ensemble model receives the ranking result from the semantic search model and the reasoning result from the reasoning model to generate a selection result, in which the selection result includes a document that answers the query. In some embodiments, the ensemble model receives a rule-based result generated from a rule-based model to retrieve the document.

Document retrieval can be performed by using a machine learning model to perform semantic matching between a query vector of a query (e.g., user query) and a document vector of a document. In some cases, the machine learning model ranks a set of documents based on a similarity score of each document in the set of documents. A similarity score is a numeric value that quantifies the degree of similarity between the query vector and the document vector. In many cases, the machine learning model retrieves a document having a high similarity score to answer the user query. In some cases, the machine learning model calculates an Euclidean distance between the query and the document.

However, in some cases, the document does not address the user query. For example, the machine learning model cannot obtain the information from within the document and evaluate whether the document provides helpful or rich information to address the user query. Accordingly, conventional models cannot generate accurate responses to the user query using semantic matching.

Accordingly, the present disclosure provides systems and methods that improve on conventional document retrieval systems by obtaining more accurate results that are diverse and helpful compared to existing search platforms. For example, embodiments of the present disclosure include an ensemble model that receives a ranking result from a semantic search model and a reasoning result from a reasoning model to retrieve a document in response to a query. In one aspect, the reasoning model identifies whether a document includes rich and helpful information. In some embodiments, the reasoning model includes a large language model (LLM) trained to extract information from the document and to evaluate whether the document answers the query based on the extracted information. By combining a ranking result (e.g., including a document with high semantic similarity to the user query) from the semantic search model and a reasoning result from the reasoning model, the ensemble model provides robust capability in answering a user query with accurate information.

According to some embodiments, the ensemble model receives a rule-based result generated from a rule-based model. For example, the rule-based model filters out a lengthy document or a short document. By further receiving the rule-based result, the ensemble model is able to increase the accuracy in document retrieval.

According to some aspects of the present disclosure, the document retrieval system includes a prompt generator and reasoning model. In one aspect, the prompt generator generates a prompt for the reasoning model. In one aspect, the reasoning model generates a reasoning result based on the prompt. For example, the reasoning result indicates whether the document answers the query. According to some aspects, the document retrieval system further includes a semantic search model. In one aspect, the semantic search model selects a document from a plurality of documents based on a ranking result of each of the plurality of documents.

By generating a prompt for a reasoning model based on a query and a document, the prompt generator is able to initiate an in-context learning ability of the reasoning model. For example, the prompt represents contextual understanding between the query and the document. By generating a reasoning result based on the prompt, the reasoning model is able to output a document that accurately answers the query than conventional document retrieval systems. For example, in some cases, a relevant document cannot answer the query. However, the reasoning result, for example, includes relevant documents that answer the query.

By combining a ranking result and a reasoning result, embodiments of the present disclosure can enhance applications such as search engines, recommendation systems, and information retrieval systems. Additionally or alternatively, the document retrieval system of the present disclosure can be used to complement (e.g., to increase the performance of) existing large language models (LLMs). Furthermore, embodiments of the present disclosure enable these applications to accurately generate responses to user queries.

Figure 2:
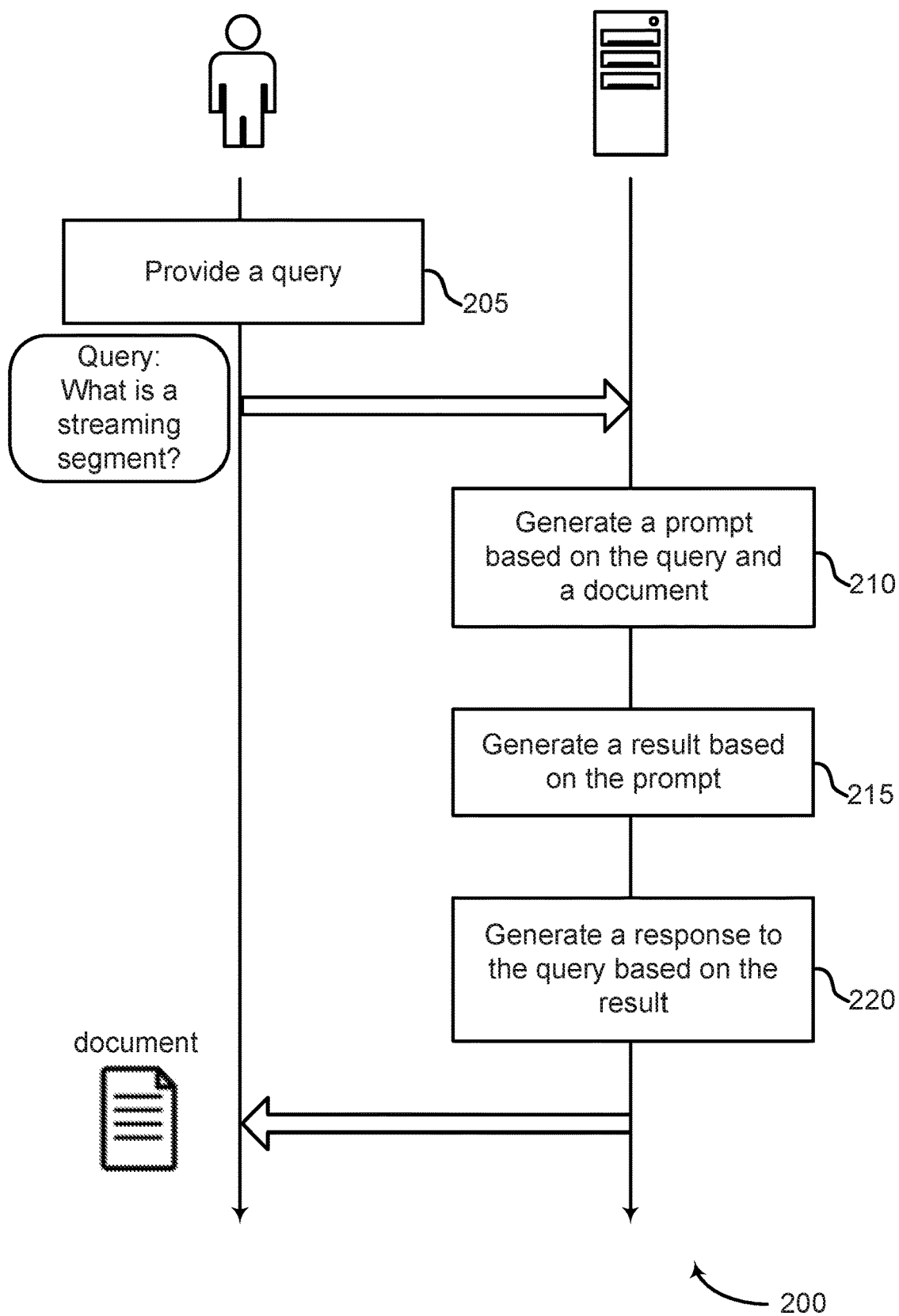
FIG. 2 shows an example of a method for retrieving a document according to aspects of the present disclosure.
Figure 3:
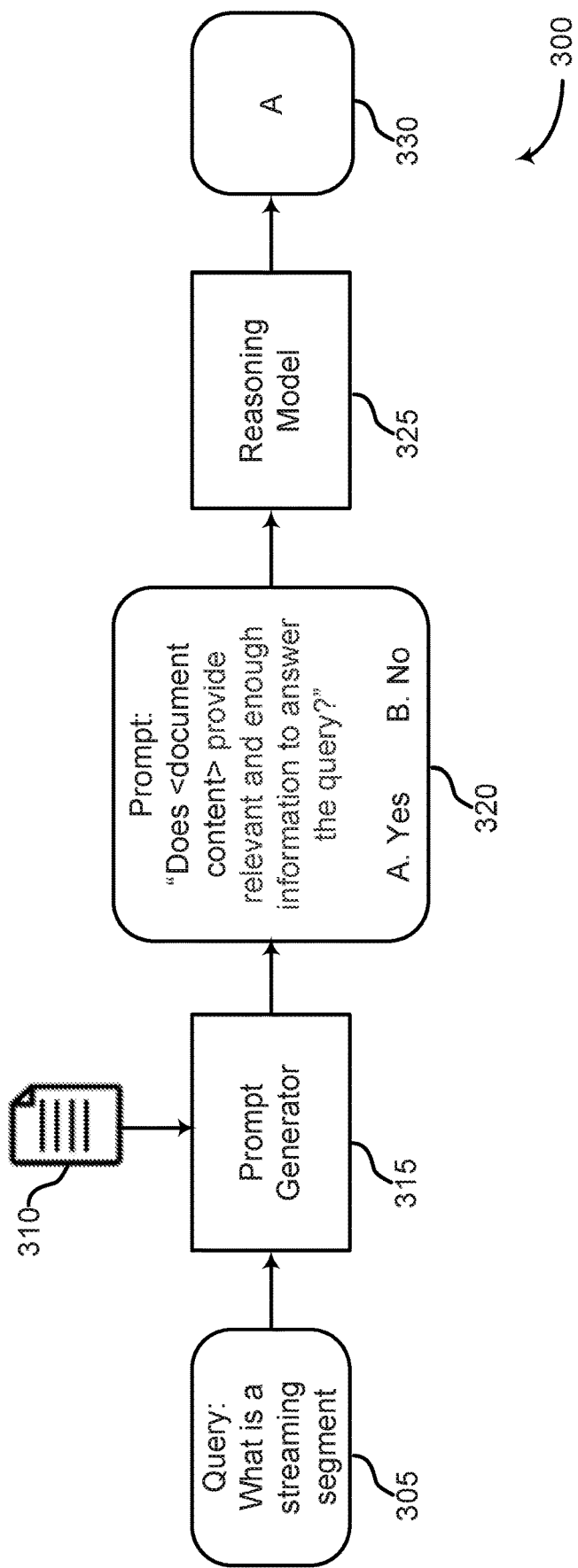
FIG. 3 shows an example of an in-context and reasoning model according to aspects of the present disclosure.

An example application of the inventive concept in document retrieval is provided with reference to FIGS. 2-3. Details regarding the architecture of a document retrieval apparatus are provided with reference to FIGS. 5-6. An Example of a process for document retrieval is provided with reference to FIGS. 4 and 7. A description of an example training process is provided with reference to FIGS. 8-10.

As used herein, the term "query" refers to a request for information. The request includes a question, a command, a set of keywords, a search term, and/or criteria. In some cases, a query includes a text-based query, a voice query, or a command to computer programs. In some cases, the information is requested by a user.

As used herein, the term "document" refers to written, printed, or electronically recorded information, content, or data. In some cases, a document includes text-based documents, spreadsheets, presentations, images, PDFs, HTML Web pages, books, legal documents, and records. In some cases, a document includes a snippet or a portion of the text of the document.

As used herein, the term "prompt" refers to a text that represents a contextual relationship between the query and the document. The prompt can be represented as a question, a close-ended question, a statement, a command, or a multiple-choice question.

As used herein, the term "ranking result" refers to an ordered set of documents. For example, the ranking result can be generate by a semantic search model. As used herein, the term "reasoning result" refers to an answer generated by a reasoning mode. In some cases, the reasoning result includes a document.

As used herein, the term "rule-based result" includes a set of documents generated or ordered by a rule-based model. As used herein, the term "selection result" refers to a document selected by the ensemble model. In some cases, the selection result includes a portion of text, a portion of content, or a portion of information from the selected document.

As used herein, the term "embedding" refers to a numerical representation of words, sentences, documents, or images in a vector space. The embedding is used to encode semantic meaning, relationships, and context of the words, sentences, documents, or images where the encoding can be processed by a machine learning model.

Document Retrieval

In FIGS. 1-4, a method, apparatus, non-transitory computer readable medium, and system for document retrieval are described. One or more aspects of the method, apparatus, non-transitory computer readable medium, and system include obtaining a query and a document; generating, using a prompt generator, a prompt for a reasoning model based on the query and the document; generating, using the reasoning model, a reasoning result based on the prompt, wherein the reasoning result indicates that the document answers the query; and providing the document in response to the query based on the reasoning result.

Some examples of the method, apparatus, non-transitory computer readable medium, and system further include generating, using a semantic search model, a query embedding based on the query. Some examples further include ranking, using the semantic search model, a plurality of documents based on the query embedding to obtain a ranking result. Some examples further include selecting, using the semantic search model, the document from the plurality of documents based on the ranking result.

Some examples of the method, apparatus, non-transitory computer readable medium, and system further include computing a document embedding based on the document. Some examples further include comparing the query embedding to the document embedding, wherein the ranking is based on the comparison.

Some examples of the method, apparatus, non-transitory computer readable medium, and system further include combining, using an ensemble model, the reasoning result and the ranking result to obtain a selection result, wherein the document is provided based on the selection result. Some examples of the method, apparatus, non-transitory computer readable medium, and system further include evaluating, using a rule-based model, the document to obtain a rule-based result, wherein the selection result is based at least in part on the rule-based result.

Some examples of the method, apparatus, non-transitory computer readable medium, and system further include formulating the prompt as a multiple-choice question. Some examples of the method, apparatus, non-transitory computer readable medium, and system further include retrieving a plurality of documents from a database, wherein the document is selected from the plurality of documents based on the reasoning result.

FIG. 1 shows an example of a document retrieval system according to aspects of the present disclosure. The example shown includes user 100, user device 105, document retrieval apparatus 110, cloud 115, and database 120. Document retrieval apparatus 110 is an example of, or includes aspects of, the corresponding element described with reference to FIG. 5.

Referring to FIG. 1, according to some embodiments, user 100 provides a query to document retrieval apparatus 110 via user device 105 and cloud 115. For example, the query includes a question from the user asking "What is a streaming segment?" In some cases, document retrieval apparatus 110 retrieves a document that answers the query. In some cases, document retrieval apparatus 110 generates a response that answers the query based on a portion of the information in the document. In some embodiments, document retrieval apparatus 110 displays the document (or the response) to user 100 via user device 105 and cloud 115.

In some embodiments, document retrieval apparatus 110 retrieves a plurality of documents, where each of the plurality of documents has a high semantic similarity score. In some embodiments, document retrieval apparatus 110 generates a prompt based on the plurality of documents and the query. In one aspect, document retrieval apparatus 110 generates a reasoning result based on the prompt. In some embodiments, document retrieval apparatus 110 generates a document (or the response) based on the plurality of documents and the reasoning result.

User device 105 can be a personal computer, laptop computer, mainframe computer, palmtop computer, personal assistant, mobile device, or any other suitable processing apparatus. In some examples, user device 105 includes software that incorporates an image detection application. In some examples, the image detection application on user device 105 can include functions of document retrieval apparatus 110.

A user interface can enable user 100 to interact with user device 105. In some embodiments, the user interface can include an audio device, such as an external speaker system, an external display device such as a display screen, or an input device (e.g., a remote-controlled device interfaced with the user interface directly or through an I/O controller module). In some cases, a user interface can be a graphical user interface (GUI). In some examples, a user interface can be represented in code in which the code is sent to the user device 105 and rendered locally by a browser. The process of using the document retrieval apparatus 110 is further described with reference to FIG. 2.

Document retrieval apparatus 110 is an example of, or includes aspects of, the corresponding element described with reference to FIG. 5. According to some aspects, document retrieval apparatus 110 includes a computer implemented network comprising a machine learning model, a semantic search model, a prompt generator, a reasoning model, a rule-based model, and an ensemble model. Document retrieval apparatus 110 further includes a processor unit, a memory unit, an I/O module, and a training component. In some embodiments, document retrieval apparatus 110 further includes a communication interface, user interface components, and a bus as described with reference to FIG. 11. Additionally, document retrieval apparatus 110 communicates with user device 105 and database 125 via cloud 115. Further detail regarding the operation of document retrieval apparatus 110 is provided with reference to FIGS. 2, 4, and 7.

In some cases, document retrieval apparatus 110 is implemented on a server. A server provides one or more functions to users linked by way of one or more of the various networks. In some cases, the server includes a single microprocessor board, which includes a microprocessor responsible for controlling aspects of the server. In some cases, a server uses the microprocessor and protocols to exchange data with other devices/users on one or more of the networks via hypertext transfer protocol (HTTP), and simple mail transfer protocol (SMTP), although other protocols such as file transfer protocol (FTP), and simple network management protocol (SNMP) can also be used. In some cases, a server is configured to send and receive hypertext markup language (HTML) formatted files (e.g., for displaying web pages). In various embodiments, a server comprises a general-purpose computing device, a personal computer, a laptop computer, a mainframe computer, a supercomputer, or any other suitable processing apparatus.

Cloud 115 is a computer network configured to provide on-demand availability of computer system resources, such as data storage and computing power. In some examples, cloud 115 provides resources without active management by the user (e.g., user 100). The term cloud is sometimes used to describe data centers available to many users over the Internet. Some large cloud networks have functions distributed over multiple locations from central servers. A server is designated an edge server if the server has a direct or close connection to a user. In some cases, cloud 115 is limited to a single organization. In other examples, cloud 115 is available to many organizations. In one example, cloud 115 includes a multi-layer communications network comprising multiple edge routers and core routers. In another example, cloud 115 is based on a local collection of switches in a single physical location.

According to some aspects, database 120 stores a plurality of documents. Database 120 is an organized collection of data. For example, database 120 stores data in a specified format known as a schema. Database 120 can be structured as a single database, a distributed database, multiple distributed databases, or an emergency backup database. In some cases, a database controller can manage data storage and processing in database 120. In some cases, a user (e.g., user 100) interacts with the database controller. In other cases, the database controller can operate automatically without user interaction. Database 120 is an example of, or includes aspects of, the corresponding element described with reference to FIG. 6.

FIG. 2 shows an example of a method 200 for retrieving a document according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

Referring to FIG. 2, according to some aspects, a document retrieval apparatus (such as the document retrieval apparatus described with reference to FIGS. 1 and 5) retrieves a document based on a query (e.g., a user query). In some cases, the document retrieval apparatus generates an answer to the query based on the document. In some examples, the document includes rich and helpful information that answers the query. In some aspects, the document retrieval apparatus includes a semantic search model capable of ranking a set of documents based on a semantic similarity between each of the set of documents and the query. In some aspects, the document retrieval apparatus includes a reasoning model capable of performing in-context reasoning and understanding the information within the document.

In some embodiments, the document retrieval apparatus is fine-tuned. For example, after the document retrieval apparatus retrieves the document, the document retrieval apparatus displays the document to an annotator (e.g., the user described with reference to FIG. 1). The document retrieval apparatus can receive feedback (e.g., annotations) from the annotator that indicates whether the document is helpful in answering the query. In some embodiments, the document retrieval apparatus is updated based on the feedback. Additionally, each of the models (e.g., semantic search model, reasoning model, and ensemble model) of the document retrieval apparatus is fine-tuned differently and/or jointly. Accordingly, by combining the semantic search model and the reasoning model, and applying fine-tuning with annotations to these models, the document retrieval apparatus is able to retrieve a document that correctly answers a query.

At operation 205, the user provides a query. In some cases, the operations of this step refer to, or can be performed by, a user as described with reference to FIG. 1. For example, in some cases, the user provides a query to a document retrieval apparatus (e.g., the document retrieval apparatus described with reference to FIG. 1) via a user interface provided by the document retrieval apparatus on a user device (e.g., the user device described with reference to FIG. 1). For example, the query is a text-based question that states "What is a streaming segment?" In some cases, the query is a voice-based question, statement, or command.

At operation 210, the system generates a prompt based on the query and a document. In some cases, the operations of this step refer to, or can be performed by, a document retrieval apparatus as described with reference to FIGS. 1 and 5. In some cases, the operations of this step refer to, or can be performed by, a prompt generator as described with reference to FIGS. 3, 5, and 6. In some cases, the prompt generator receives the query and a relevant document generated by a semantic search model and formulates the prompt as a multiple-choice question. For example, the multiple-choice question can be formulated as whether this document answers the query.

At operation 215, the system generates a result based on the prompt. In some cases, the operations of this step refer to, or can be performed by, a document retrieval apparatus as described with reference to FIGS. 1 and 5. In some cases, the operations of this step refer to, or can be performed by, a reasoning model as described with reference to FIGS. 3, 5-6, and 9. In some cases, the reasoning model generates an answer to the prompt. For example, the reasoning model generates a "yes" which indicates that the document answers the query. In some cases, the reasoning model generates an "A" as an indicator representing the choice that signifies the document answers the prompt. In some cases, the reasoning model generates a "no" or a "B" indicating the document does not answer the query.

At operation 220, the system generates a response to the query based on the result. In some cases, the operations of this step refer to, or can be performed by, a document retrieval apparatus as described with reference to FIGS. 1 and 5. For example, the response includes a document that answers the query. For example, the response includes a portion of the text within the document that answers the query. In some cases, the document retrieval apparatus displays the response to the user via a user device.

FIG. 3 shows an example of an in-context and reasoning model according to aspects of the present disclosure. The example shown includes in-context and reasoning model 300, query 305, document 310, prompt generator 315, prompt 320, reasoning model 325, and reasoning result 330. In some cases, in-context and reasoning model 300 includes prompt generator 315 and reasoning model 325. In some cases, prompt generator 315 is not part of in-context and reasoning model 300.

Referring to FIG. 3, prompt generator 315 receives query 305 and document 310. In some examples, query 305 is provided by a user. In some cases, query 305 indicates "What is a streaming segment?" In some cases, document 310 is generated from a semantic search model. In some cases, document 310 is retrieved from a database. Then, prompt generator 315 generates prompt 320 based on query 305 and document 310. In some cases, prompt 320 is formulated as a multiple-choice question. For example, prompt 320 includes a prompt template as follows: "Question: An Adobe user has a question: {question content}. Does the document: {document content} provide relevant and enough information to answer the question? A. Yes. B. No. Answer: {prediction}." Reasoning model 325 receives prompt 320 and generates reasoning result 330 based on prompt 320. In some cases, reasoning model 325 includes a large language model (LLM). Details on LLM are described with reference to FIG. 5.

In an example use case, prompt 320 states "Question: An Adobe user has a question: 'What is a streaming segment'. Does the document: 'Streaming Segmentation UI Guide-|Adobe Experience Platform Streaming segmentation on Adobe Experience Platform allows customers to do segmentation in near real-time while focusing on data richness. With streaming segmentation, segment qualification now happens as streaming data lands into Platform, alleviating the need to schedule and run segmentation jobs. With this capability, most segment rules can now be evaluated as the data is passed into Platform, meaning segment membership will be kept up-to-date without running scheduled segmentation jobs.' provide relevant and enough information to answer the question? A. Yes. B. No." As shown in the use case, prompt 320 includes contents from query 305 and document 310. Accordingly, reasoning model 325 evaluates and predicts an answer "A" to prompt 320 because document 310 answers query 305.

In an example use case, prompt 320 states "Question: An Adobe user has a question: 'what is a streaming segment'. Does the document: 'Create and publish audiences to Real-time Customer Profile|Adobe Customer Journey Analytics After you have created an audience, Adobe creates an Experience Platform streaming segment for each new CJA audience. An AEP streaming segment will only be created if your organization is set up for streaming segmentation.' provide relevant and enough information to answer the question? A. Yes. B. No." Accordingly, reasoning model 325 evaluates and predicts an answer "B" to prompt 320 because document 310 does not answer query 305.

Prompt generator 315 is an example of, or includes aspects of, the corresponding element described with reference to FIGS. 5 and 6. Reasoning model 325 is an example of, or includes aspects of, the corresponding element described with reference to FIGS. 5, 6, and 9.

Figure 4:
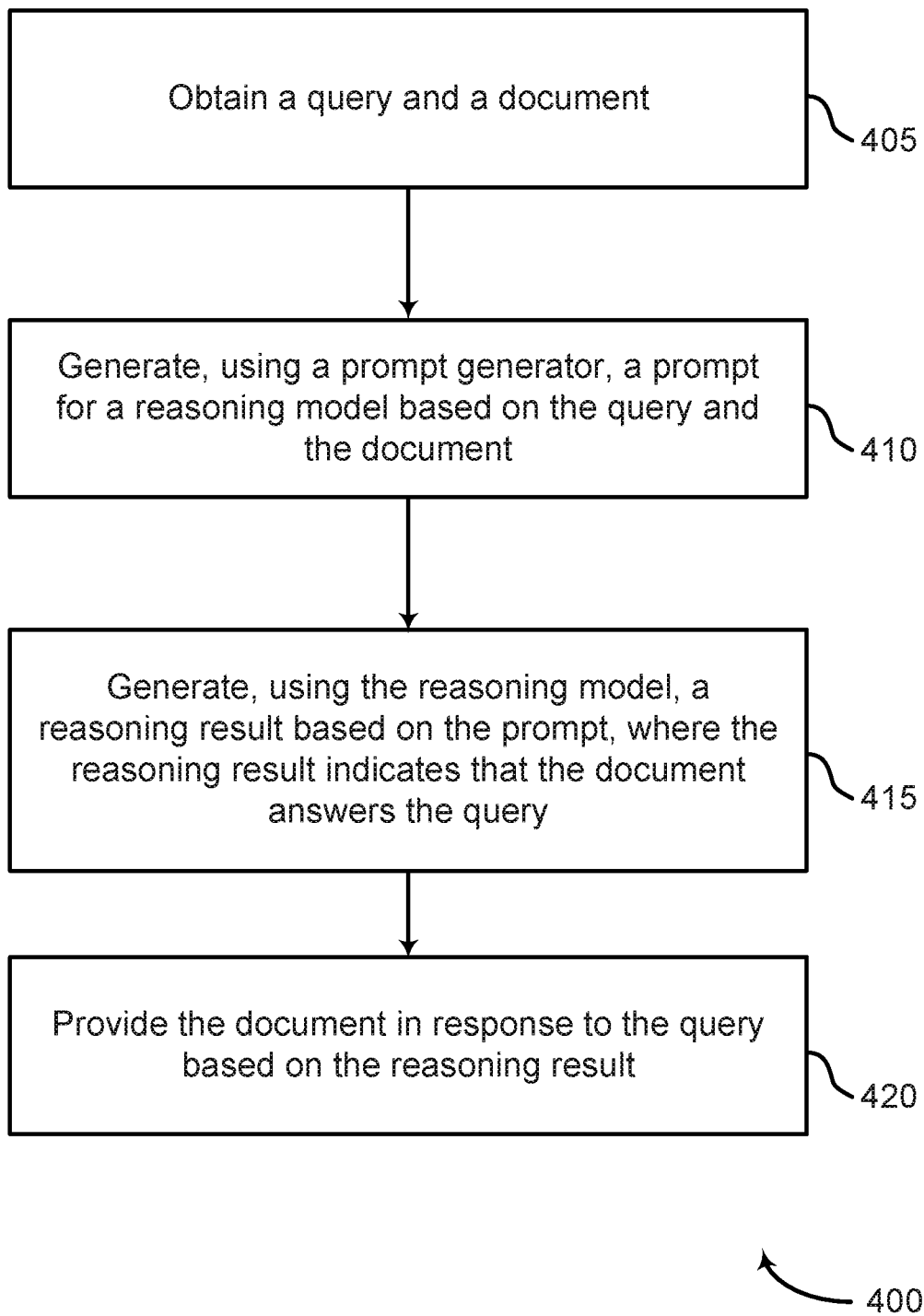
FIG. 4 shows an example of a method for retrieving a document based on a query according to aspects of the present disclosure.

FIG. 4 shows an example of a method 400 for retrieving a document based on a query according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 405, the system obtains a query and a document. In some cases, the operations of this step refer to, or can be performed by, a machine learning model as described with reference to FIGS. 5, 6, and 9. For example, the query is provided by a user. In some cases, the query is a question, a statement, a command, or a combination thereof. In some cases, the query is text-based or voice-based. In some examples, the document is a ranked document generated by a semantic search model. In some cases, the document is retrieved from a database.

At operation 410, the system generates, using a prompt generator, a prompt for a reasoning model based on the query and the document. In some cases, the operations of this step refer to, or can be performed by, a prompt generator as described with reference to FIGS. 3, 5, and 6. In some cases, for example, the prompt is formulated as a multiple-choice question having two or more answer choices. The prompt includes contents from the query and the document.

At operation 415, the system generates, using the reasoning model, a reasoning result based on the prompt, where the reasoning result indicates that the document answers the query. In some cases, the operations of this step refer to, or can be performed by, a reasoning model as described with reference to FIGS. 3, 5, 6, and 9. In some cases, for example, the reasoning model is trained to evaluate whether a document includes sufficient details that can be used to properly address the query. In one aspect, the reasoning model includes a large language model (LLM) capable of analyzing texts in the document. In some examples, the reasoning model evaluates and predicts an answer choice among the answers provided by the generated prompt. For example, the reasoning result is the predicted answer choice.

At operation 420, the system provides the document in response to the query based on the reasoning result. In some cases, the operations of this step refer to, or can be performed by, a machine learning model as described with reference to FIGS. 5, 6, and 9. In some cases, the document is used as an input to a LLM or an ensemble model. In some cases, when a reasoning result indicates a document answers the query, then the document is displayed to the user.

System Architecture

Figure 5:
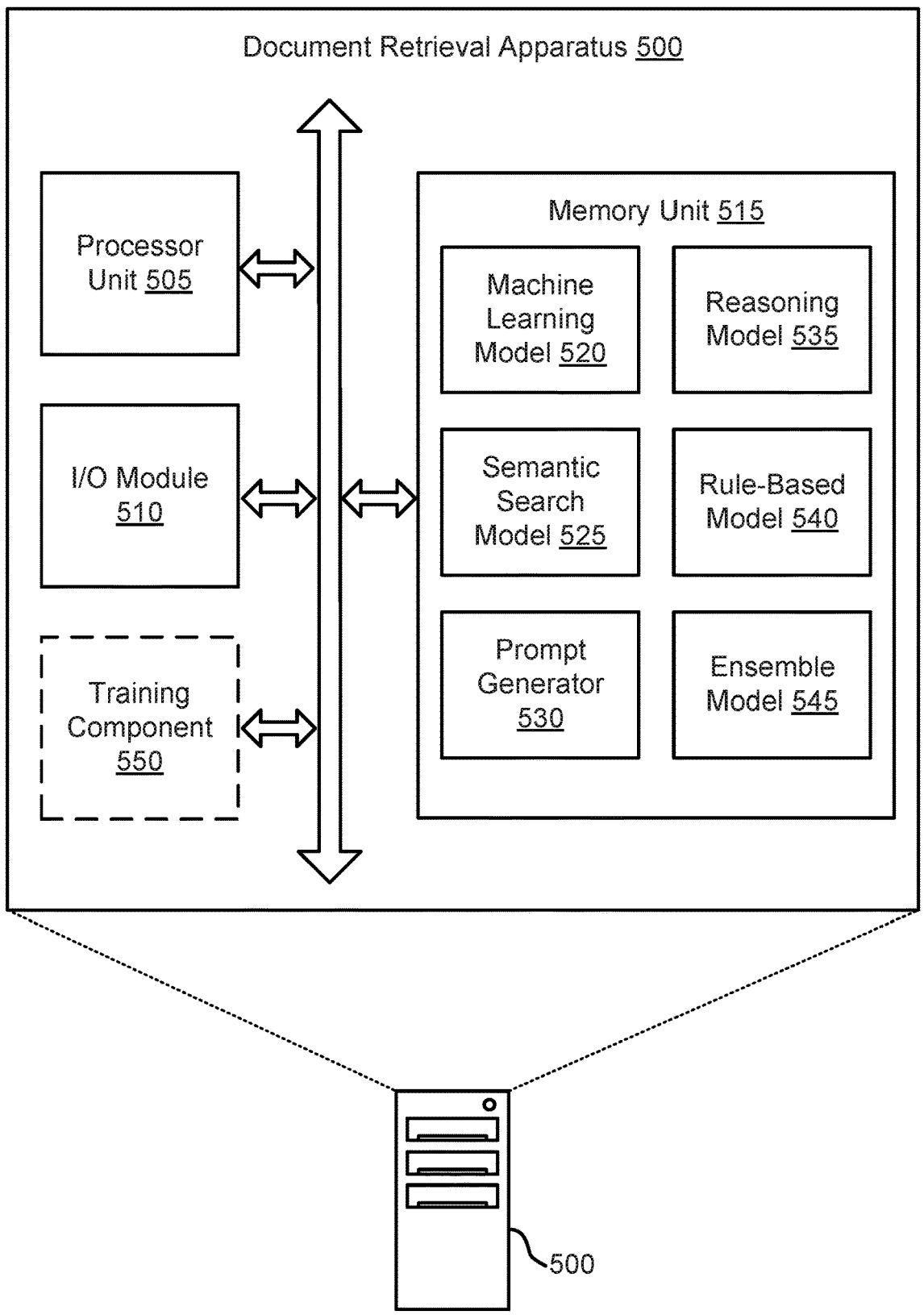
FIG. 5 shows an example of a document retrieval apparatus according to aspects of the present disclosure.
Figure 6:
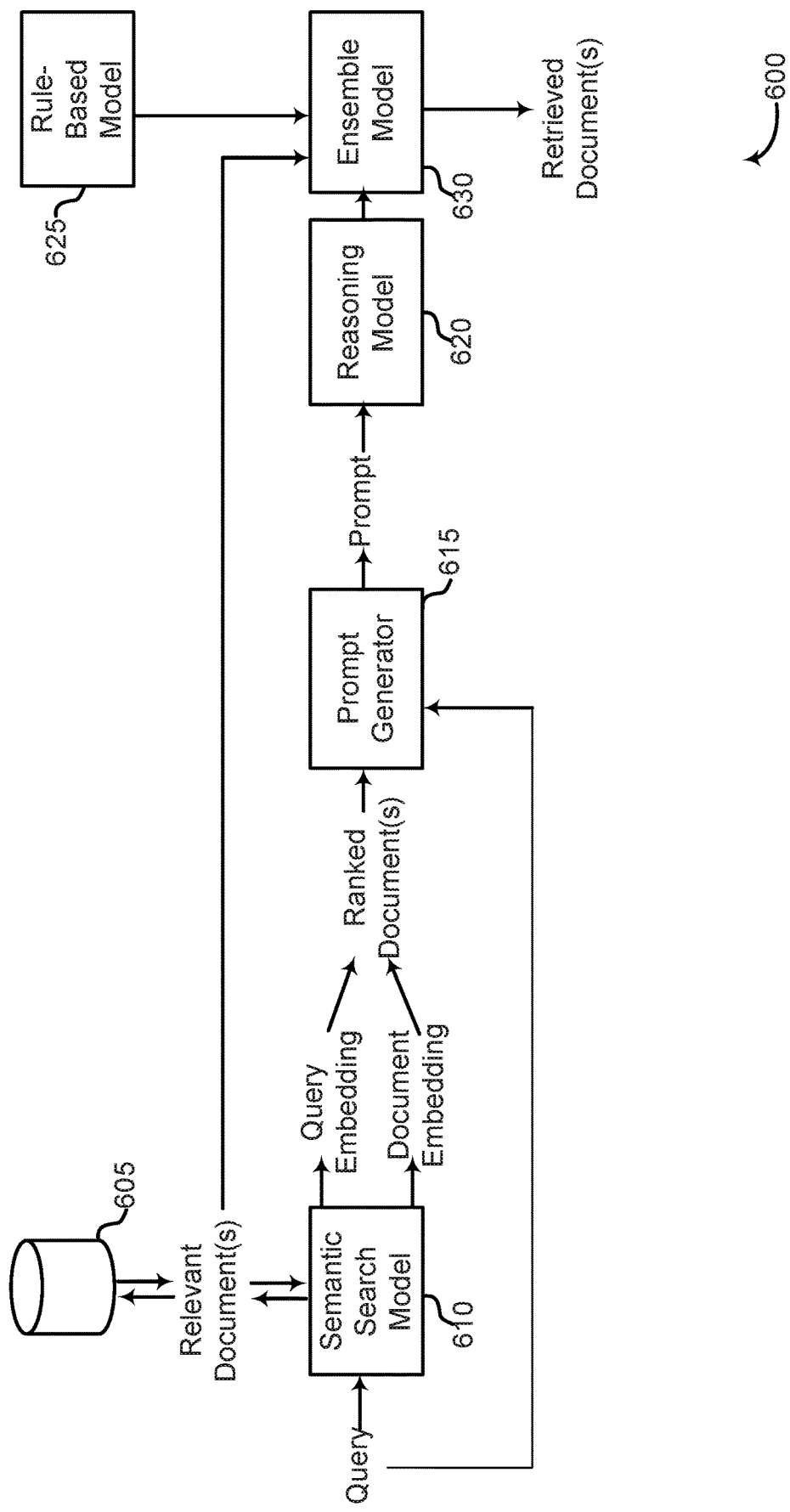
FIG. 6 shows an example of an in-context and semantic-aware ensemble model according to aspects of the present disclosure.

In FIGS. 5-6, an apparatus, system, and method for document retrieval are described. One or more aspects of the apparatus, system, and method include at least one processor; at least one memory including instructions executable by the at least one processor; a prompt generator comprising parameters stored in the at least one memory, wherein the prompt generator is trained to generate a prompt based on a query and a document; and a reasoning model comprising parameters stored in the at least one memory, wherein the reasoning model is trained to output a reasoning result based on the prompt.

Some examples of the apparatus, system, and method further include a semantic search model comprising parameters stored in the at least one memory, wherein the semantic search model is trained to output a ranking result based on the query and to rank a plurality of documents based on the ranking result. Some examples of the apparatus, system, and method further include an ensemble model comprising parameters stored in the at least one memory, wherein the ensemble model is trained to combine the ranking result and the reasoning result.

Some examples of the apparatus, system, and method further include a rule-based model comprising parameters stored in the at least one memory, wherein the rule-based model is configured to output a rule-based result based on the document. In some aspects, the reasoning model comprises a large language model (LLM). In some aspects, the reasoning model comprises a transformer model. Some examples of the apparatus, system, and method further include a database storing a plurality of documents.

FIG. 5 shows an example of a document retrieval apparatus 500 according to aspects of the present disclosure. Document retrieval apparatus 500 is an example of, or includes aspects of, the corresponding element described with reference to FIG. 1. The example shown includes document retrieval apparatus 500, processor unit 505, I/O module 510, memory unit 515, machine learning model 520, semantic search model 525, prompt generator 530, reasoning model 535, rule-based model 540, ensemble model 545, and training component 550. In some embodiments, machine learning model 520 includes semantic search model 525, prompt generator 530, reasoning model 535, rule-based model 540, and ensemble model 545. In some embodiments, document retrieval apparatus 500 includes a database.

Processor unit 505 is an intelligent hardware device, (e.g., a general-purpose processing component, a digital signal processor (DSP), a central processing unit (CPU), a graphics processing unit (GPU), a microcontroller, an application-specific integrated circuit (ASIC), a field programmable gate array (FPGA), a programmable logic device, a discrete gate or transistor logic component, a discrete hardware component, or any combination thereof). In some cases, processor unit 505 is configured to operate a memory array using a memory controller. In other cases, a memory controller is integrated into the processor. In some cases, processor unit 505 is configured to execute computer-readable instructions stored in a memory to perform various functions. In some embodiments, processor unit 505 includes special-purpose components for modem processing, baseband processing, digital signal processing, or transmission processing. Processor unit 505 is an example of, or includes aspects of, the processor described with reference to FIG. 11.

I/O module 510 (e.g., an input/output interface) can include an I/O controller. An I/O controller can manage input and output signals for a device. I/O controller can also manage peripherals not integrated into a device. In some cases, an I/O controller can represent a physical connection or port to an external peripheral. In some cases, an I/O controller can utilize an operating system such as iOS®, ANDROID®, MS-DOS®, MS-WINDOWS®, OS/2®, UNIX®, LINUX®, or another known operating system. In other cases, an I/O controller can represent or interact with a modem, a keyboard, a mouse, a touchscreen, or a similar device. In some cases, an I/O controller can be implemented as part of a processor. In some cases, a user can interact with a device via an I/O controller or via hardware components controlled by an I/O controller.

In some examples, I/O module 510 includes a user interface. A user interface can enable a user to interact with a device. In some embodiments, the user interface can include an audio device, such as an external speaker system, an external display device such as a display screen, or an input device (e.g., remote control device interfaced with the user interface directly or through an I/O controller module). In some cases, a user interface can be a graphical user interface (GUI). In some examples, a communication interface operates at the boundary between communicating entities and the channel and can also record and process communications. Communication interface is provided herein to enable a processing system coupled to a transceiver (e.g., a transmitter and/or a receiver). In some examples, the transceiver is configured to transmit (or send) and receive signals for a communications device via an antenna.

Examples of memory unit 515 include random access memory (RAM), read-only memory (ROM), or a hard disk. Examples of memory unit 515 include solid-state memory and a hard disk drive. In some examples, memory unit 515 is used to store computer-readable, computer-executable software including instructions that, when executed, cause a processor to perform various functions described herein. In some cases, memory unit 515 contains, among other things, a basic input/output system (BIOS) which controls basic hardware or software operations such as the interaction with peripheral components or devices. In some cases, a memory controller operates memory cells. For example, the memory controller can include a row decoder, column decoder, or both. In some cases, memory cells within memory unit 515 store information in the form of a logical state. Memory unit 515 is an example of, or includes aspects of, the memory subsystem described with reference to FIG. 11.

In some examples, memory unit 515 includes instructions executable by processor unit 505. Memory unit 515 includes machine learning model 520 or stores parameters of machine learning model 520. Machine learning model 520 includes semantic search model 525, prompt generator 530, reasoning model 535, rule-based model 540, and ensemble model 545. In some cases, machine learning model 520 is a computational algorithm, model, or system designed to recognize patterns, make predictions, or perform a specific task (for example, document retrieval) without being explicitly programmed.

According to some aspects, machine learning model 520 obtains a query and a document. In some examples, machine learning model 520 provides the document in response to the query based on a reasoning result. In some examples, machine learning model 520 retrieves a set of documents from a database, where the document is selected from the set of documents based on the reasoning result. Machine learning model 520 is an example of, or includes aspects of, the corresponding element described with reference to FIGS. 6 and 9.

According to some aspects, semantic search model 525 generates a query embedding based on the query. In some examples, semantic search model 525 ranks a set of documents based on the query embedding to obtain a ranking result. In some examples, semantic search model 525 selects the document from the set of documents based on the ranking result. In some examples, semantic search model 525 computes a document embedding based on the document. In some examples, semantic search model 525 compares the query embedding to the document embedding, where the ranking is based on the comparison.

According to some aspects, semantic search model 525 comprises parameters stored in the at least one memory, wherein semantic search model 525 is trained to output a ranking result based on the query and to rank a plurality of documents based on the ranking result. Semantic search model 525 is an example of, or includes aspects of, the corresponding element described with reference to FIGS. 6 and 9.

According to some aspects, prompt generator 530 generates a prompt for reasoning model 535 based on a query and a document. In some examples, prompt generator 530 formulates the prompt as a multiple-choice question.

According to some aspects, prompt generator 530 comprises parameters stored in the at least one memory, wherein prompt generator 530 is trained to generate a prompt based on a query and a document. Prompt generator 530 is an example of, or includes aspects of, the corresponding element described with reference to FIGS. 3 and 6.

According to some aspects, reasoning model 535 generates a reasoning result based on the prompt, where the reasoning result indicates that the document answers the query. According to some aspects, reasoning model 535 generates a predicted reasoning result that indicates whether the document answers the query.

According to some aspects, reasoning model 535 comprises parameters stored in the at least one memory, wherein reasoning model 535 is trained to output a reasoning result based on the prompt. In some aspects, reasoning model 535 includes a large language model (LLM). In some aspects, reasoning model 535 includes a transformer model. Reasoning model 535 is an example of, or includes aspects of, the corresponding element described with reference to FIGS. 3, 6, and 9.

LLM is a model capable of performing tasks in natural language processing (NLP). LLM is trained using deep learning and large datasets to understand, summarize, generate, and predict new content. In some cases, LLM is trained with an unsupervised learning technique, where the LLM is trained on unstructured data and unlabeled data. LLM includes one or more neural networks that enables the LLM to understand, recognize, and learn the relationships and connections between words, sentences, and concepts using a self-attention mechanism. In some cases, an LLM can be used in NLP, text generation, machine translation, text summarization, sentiment analysis, contextual understanding, and question-answering.

A neural network is a type of computer algorithm capable of learning specific patterns without being explicitly programmed, but through iterations over known data. A neural network refers to a cognitive model that includes input nodes, hidden nodes, and output nodes. Nodes in the network can have an activation function that computes whether the node is activated based on the output of previous nodes. Training the system can involve supplying values for the inputs, and modifying edge weights and activation functions (algorithmically or randomly) until the result closely approximates a set of desired outputs.

In some cases, the document retrieval apparatus 500 includes one or more artificial neural networks (ANN). An ANN is a hardware or software component that includes a number of connected nodes (e.g., artificial neurons), which loosely correspond to the neurons in a human brain. Each connection, or edge, transmits a signal from one node to another (like the physical synapses in a brain). When a node receives a signal, it processes the signal and then transmits the processed signal to other connected nodes. In some cases, the signals between nodes comprise real numbers, and the output of each node is computed by a function of the sum of its inputs. In some examples, nodes can determine their output using other mathematical algorithms (e.g., selecting the max from the inputs as the output) or any other suitable algorithm for activating the node. Each node and each edge is associated with one or more node weights that determine how the signal is processed and transmitted.

During the training process, these weights are adjusted to increase the accuracy of the result (e.g., by minimizing a loss function that corresponds in some way to the difference between the current result and the target result). The weight of an edge increases or decreases the strength of the signal transmitted between nodes. In some cases, nodes have a threshold below which a signal is not transmitted at all. In some examples, the nodes are aggregated into layers. Different layers perform different transformations on their inputs. The initial layer is known as the input layer and the last layer is known as the output layer. In some cases, signals traverse certain layers multiple times.

In the machine learning field, an attention mechanism is a method of placing differing levels of importance on different elements of an input. Calculating attention can involve three basic steps. First, a similarity between the query and key vectors obtained from the input is computed to generate attention weights. Similarity functions used for this process can include the dot product, splice, detector, and the like. Next, a SoftMax function is used to normalize the attention weights. Finally, the attention weights are weighed together with their corresponding values. In the context of an attention network, the key and value are typically vectors or matrices that are used to represent the input data. The key is used to determine which parts of the input the attention mechanism should focus on, while the value is used to represent the actual data being processed.

According to some aspects, rule-based model 540 evaluates the document to obtain a rule-based result, where the selection result is based on the rule-based result. According to some aspects, rule-based model 540 comprises parameters stored in the at least one memory, wherein rule-based model 540 is configured to output a rule-based result based on the document. Rule-based model 540 is an example of, or includes aspects of, the corresponding element described with reference to FIG. 6.

According to some aspects, ensemble model 545 combines the reasoning result and the ranking result to obtain a selection result, where the document is provided based on the selection result. According to some aspects, ensemble model 545 comprises parameters stored in the at least one memory, wherein ensemble model 545 is trained to combine the ranking result and the reasoning result. Ensemble model 545 is an example of, or includes aspects of, the corresponding element described with reference to FIGS. 6 and 9.

According to some aspects, training component 550 initializes reasoning model 535. In some examples, training component 550 trains reasoning model 535 based on the predicted reasoning result and the ground-truth reasoning result. In some examples, training component 550 computes a cross entropy loss based on the predicted reasoning result and the ground-truth reasoning result. In some examples, training component 550 trains semantic search model 525 to rank documents based on search queries. In some examples, training component 550 calculates a contrastive loss based on the query and the document. In some examples, training component 550 trains ensemble model 545 to combine a reasoning result of reasoning model 535 and a ranking result of semantic search model 525. In some cases, training component 550 trains ensemble model 545 to combine a reasoning result of reasoning model 535, a ranking result of semantic search model 525, and a rule-based result of rule-based model 540.

According to some aspects, training component 550 obtains training data including a prompt, document, and a ground-truth reasoning result that indicates whether the document answers a query indicated by the prompt. In some examples, training component 550 performs a grid search of weights of semantic search model 525, reasoning model 535, and rule-based model 540.

According to some embodiments, training component 550 is implemented as software stored in memory unit 515 and executable by a processor in processor unit 505 of a separate computing device, as firmware in the separate computing device, as one or more hardware circuits of the separate computing device, or as a combination thereof. In some examples, training component 550 is part of another apparatus other than document retrieval apparatus 500 and communicates with the document retrieval apparatus 500. In some examples, training component 550 is part of document retrieval apparatus 500.

According to some embodiments, document retrieval apparatus 500 includes a database. The database stores a plurality of documents. In some cases, the database is part of another apparatus other than document retrieval apparatus 500 and communicates with the document retrieval apparatus 500. In some examples, the database is part of document retrieval apparatus 500. Database is an example of, or includes aspects of, the corresponding element described with reference to FIGS. 1 and 6.

FIG. 6 shows an example of an in-context and semantic-aware ensemble model according to aspects of the present disclosure. The example shown includes machine learning model 600, database 605, semantic search model 610, prompt generator 615, reasoning model 620, rule-based model 625, and ensemble model 630.

Referring to FIG. 6, semantic search model 610 receives a query (e.g., question q) from, for example, a user. Semantic search model 610 identifies a plurality of documents $D=\{d_1, d_2, \ldots, d_N\}$ from database 605. In some cases, the plurality of documents is referred to retrieved documents. In some cases, the retrieved documents are used as inputs to an LLM (e.g., reasoning model 620) to generate high quality responses in response to the query. In one aspect, semantic search model 610 encodes the query to generate a query embedding V (q). In one aspect, semantic search model 610 encodes each of the plurality of documents to generate a plurality of document embeddings $\{V(d_1), V(d_2), \ldots, V(d_N)\}$. In some embodiments, semantic search model 610 ranks the plurality of documents based on the query embedding and the plurality of document embeddings. After the plurality of documents are ranked, semantic search model selects the top k ranked documents $\{d_1, d_2, \ldots, d_k\}$ (sometimes referred to as intermediate documents) and provides the query and the k ranked documents to prompt generator 615 to generate a prompt P. In some cases, prompt generator 615 receives the query and the k ranked documents to generate k prompts, respectively. The prompt P is used as an input to reasoning model 620 to generate a reasoning result. In some embodiments, reasoning model 620 includes an LLM Mie that performs in-context learning. Ensemble model 630 receives the learning result $r_{ic}=M_{ic}(P)$, a ranking result $r_{ss}=M_{ss}(v_q, v_d)$ including a plurality of documents, and a rule-based result $r_{rb}=M_{rb}(q, D)$ that captures additional semantic information from the plurality of documents to generate a selection result $r_{ens}=M_{ens}(r_{ss}, r_{ic}, r_{rb})$. In some cases, the selection result $r_{ens}$ includes one or more retrieved documents.

Machine learning model 600 is an example of, or includes aspects of, the corresponding element described with reference to FIGS. 5 and 9. Database 605 is an example of, or includes aspects of, the corresponding element described with reference to FIG. 1. Semantic search model 610 is an example of, or includes aspects of, the corresponding element described with reference to FIGS. 5 and 9.

Prompt generator 615 is an example of, or includes aspects of, the corresponding element described with reference to FIGS. 3 and 5. Reasoning model 620 is an example of, or includes aspects of, the corresponding element described with reference to FIGS. 3, 5, and 9. Rule-based model 625 is an example of, or includes aspects of, the corresponding element described with reference to FIG. 5. Ensemble model 630 is an example of, or includes aspects of, the corresponding element described with reference to FIGS. 5 and 9.

Document Retrieval Using Ensemble Model

Figure 7:
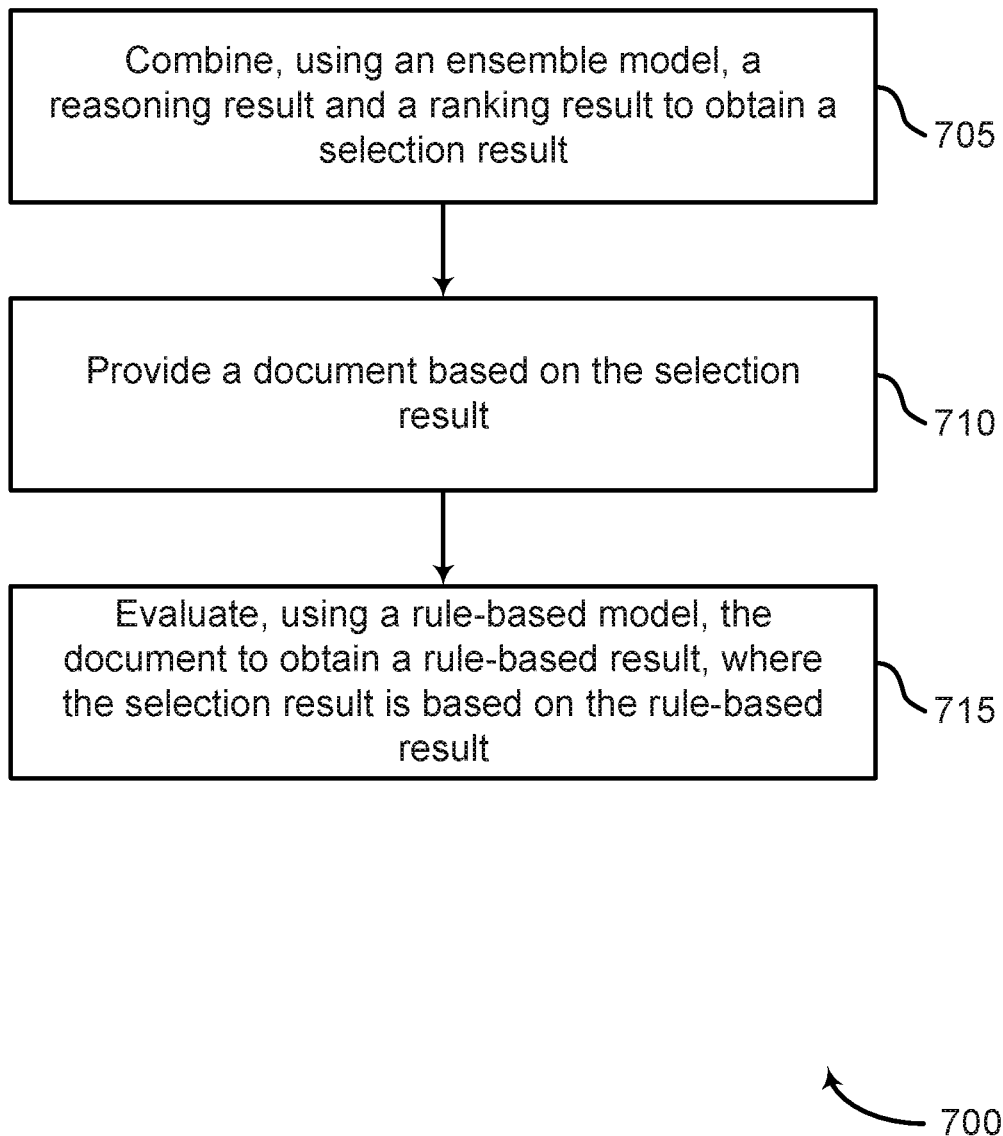
FIG. 7 shows an example of a method for generating a document using an ensemble model according to aspects of the present disclosure.

FIG. 7 shows an example of a method 700 for generating a document using an ensemble model according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 705, the system combines, using an ensemble model, a reasoning result and a ranking result to obtain a selection result. In some cases, the operations of this step refer to, or can be performed by, an ensemble model as described with reference to FIGS. 5, 6, and 9. In some cases, for example, a reasoning model generates the reasoning result. For example, the reasoning result includes a prediction that indicates whether the document answers a query provided by a user. In some cases, for example, a semantic search model generates the ranking result. For example, the ranking result includes one or more documents semantically similar to the query.

At operation 710, the system provides the document based on the selection result. In some cases, the operations of this step refer to, or can be performed by, a machine learning model as described with reference to FIGS. 5, 6, and 9. In some cases, for example, the selection result includes a document having rich and helpful information that answers the query. In some cases, the selection result includes a portion of a text of the document.

At operation 715, the system evaluates, using a rule-based model, the document to obtain a rule-based result, where the selection result is based on the rule-based result. In some cases, the operations of this step refer to, or can be performed by, a rule-based model as described with reference to FIGS. 5 and 6. In some cases, for example, the rule-based model prunes a document from a plurality of documents based on a rule. For example, the rule-based model can prune a short document because short documents might not provide enough details to answer a query. Additionally or alternatively, for example, the rule-based model can prune a lengthy document because lengthy documents tend to contain additional miscellaneous information.

According to some embodiments, the ensemble model receives one or more of the three results (e.g., ranking result, reasoning result, and rule-based result) to generate the selection results. For example, the ensemble model can receive a ranking result and a reasoning result to generate the selection result. For example, the ensemble model can receive a ranking result and a rule-based result to generate the selection result. For example, the ensemble model can receive a reasoning result and a rule-based result to generate the selection result.

Training and Evaluation

Figure 8:
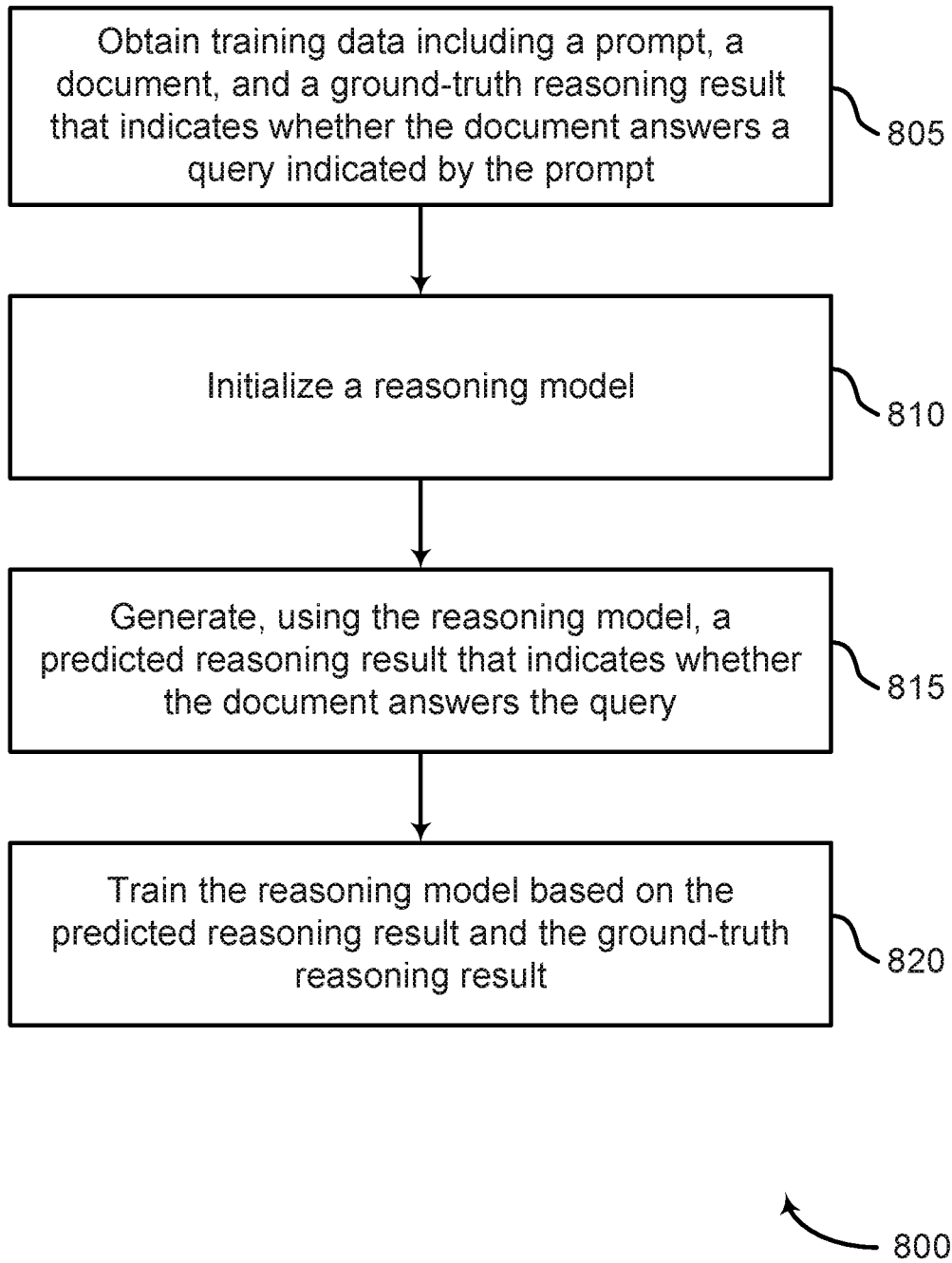
FIG. 8 shows an example of a method for training a machine learning model according to aspects of the present disclosure.
Figure 9:
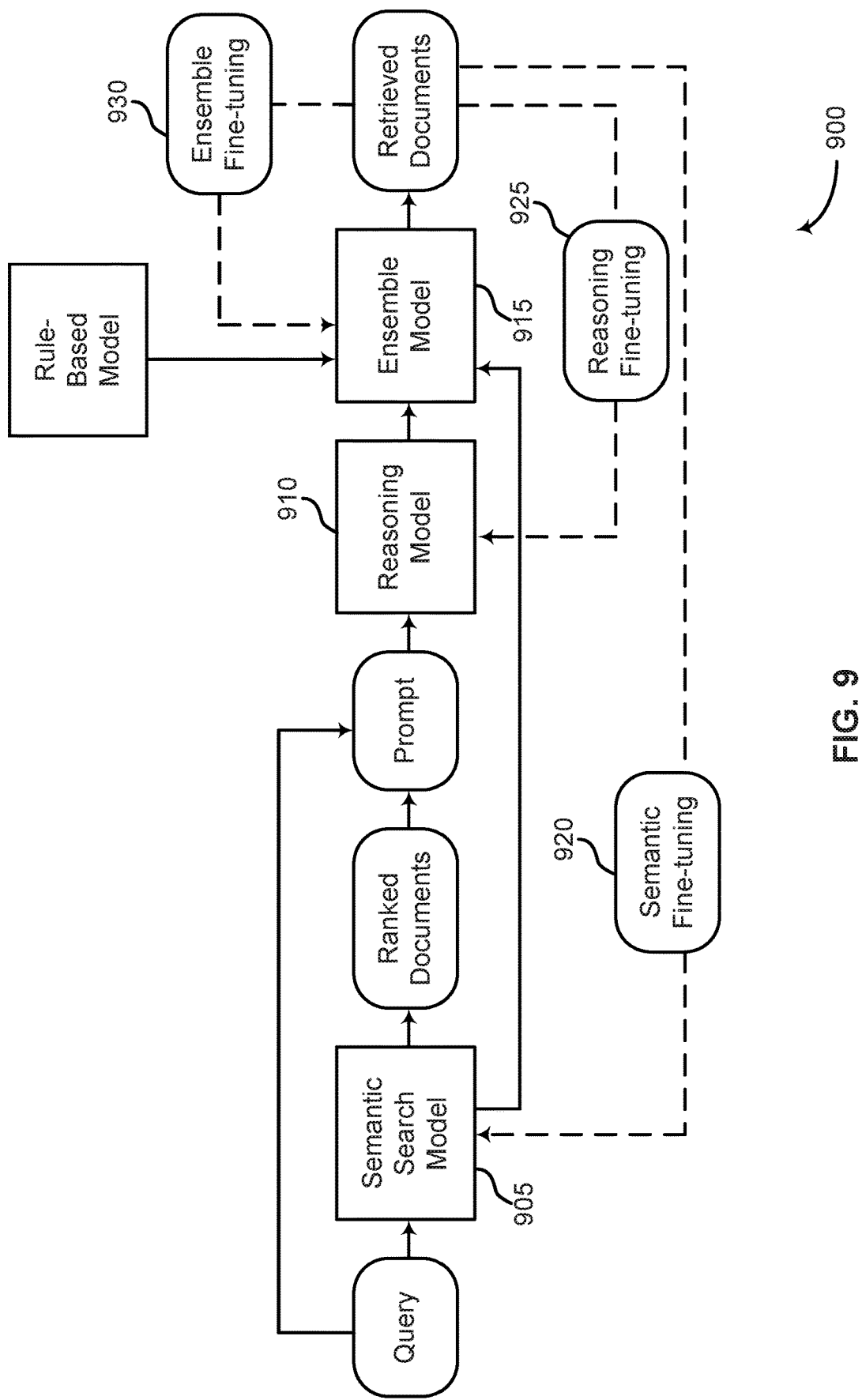
FIG. 9 shows an example of fine-tuning a machine learning model according to aspects of the present disclosure.

In FIGS. 8-10, a method, apparatus, non-transitory computer readable medium, and system for document retrieval are described. One or more aspects of the method, apparatus, non-transitory computer readable medium, and system include obtaining training data including a prompt, document, and a ground-truth reasoning result that indicates whether the document answers a query indicated by the prompt; initializing a reasoning model; generating, using the reasoning model, a predicted reasoning result that indicates whether the document answers the query; and training the reasoning model based on the predicted reasoning result and the ground-truth reasoning result.

Some examples of the method, apparatus, non-transitory computer readable medium, and system further include computing a cross entropy loss based on the predicted reasoning result and the ground-truth reasoning result. Some examples of the method, apparatus, non-transitory computer readable medium, and system further include training a semantic search model to rank documents based on search queries. Some examples of the method, apparatus, non-transitory computer readable medium, and system further include calculating a contrastive loss based on the query and the document.

Some examples of the method, apparatus, non-transitory computer readable medium, and system further include training an ensemble model to combine a reasoning result of the reasoning model and a ranking result of the semantic search model. Some examples of the method, apparatus, non-transitory computer readable medium, and system further include performing a grid search of weights of the semantic search model, the reasoning model, and a rule-based model.

FIG. 8 shows an example of a method 800 for training a machine learning model according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 805, the system obtains training data including a prompt, a document, and a ground-truth reasoning result that indicates whether the document answers a query indicated by the prompt. In some cases, the operations of this step refer to, or can be performed by, a machine learning model as described with reference to FIGS. 5, 6, and 9. In some cases, the training data is stored in a database, for example, the database described with reference to FIGS. 1 and 6. In some cases, for example, the prompt includes contents from a query and the document, where the prompt is formulated as a multiple-choice question having two or more answer choices.

At operation 810, the system initializes a reasoning model. In some cases, the operations of this step refer to, or can be performed by, a training component as described with reference to FIG. 5. For example, the machine learning model identifies learnable parameters of a semantic search model, a reasoning model, and an ensemble model.

At operation 815, the system generates, using the reasoning model, a predicted reasoning result that indicates whether the document answers the query. In some cases, the operations of this step refer to, or can be performed by, a reasoning model as described with reference to FIGS. 3, 5, 6, and 9. For example, the predicted reasoning result includes a prediction that indicates whether the document answers the query. In some cases, the predicted reasoning result is used to re-train the machine learning model.

At operation 820, the system trains the reasoning model based on the predicted reasoning result and the ground-truth reasoning result. In some cases, the operations of this step refer to, or can be performed by, a training component as described with reference to FIG. 5. In some cases, the machine learning model compares the predicted reasoning result and the ground-truth reasoning result. The machine learning model is fine-tuned based on the comparison. Further details on fine-tuning are described with reference to FIG. 9.

FIG. 9 shows an example of fine-tuning a machine learning model 900 according to aspects of the present disclosure. The example shown includes machine learning model 900, semantic search model 905, reasoning model 910, ensemble model 915, semantic fine-tuning 920, reasoning fine-tuning 925, and ensemble fine-tuning 930.

Referring to FIG. 9, embodiments of the present disclosure include fine-tuning a machine learning model to increase the performance of semantic search model 905 and reasoning model 910. For example, the performance of semantic search and reasoning capabilities on Adobe® Experience League documents is increased. According to some embodiments, after ensemble model 915 retrieves documents based on a selection result, the retrieved documents are displayed to an annotator. For example, the annotator is the user. In some cases, the annotator provides annotation (e.g., feedback or rating) indicating whether the retrieved documents are helpful in answering the query from, for example, the user.

Based on the feedback, machine learning model 900 identifies learnable parameters and fine-tunes semantic search model 905, reasoning model 910, and ensemble model 915 based on the learnable parameters. In some embodiments, these models are fine-tuned based on the training data (e.g., described with reference to FIG. 8). Each of these models is fine-tuned as described below.

According to some embodiments, semantic search model 905 is fine-tuned based on semantic fine-tuning 920. For example, semantic fine-tuning 920 includes contrastive loss and annotation. For example, for a pair of query q and document d, machine learning model 900 computes the respective embeddings, $V_q=V(q)$ and $V_d=V(d)$, and the corresponding distance $D(V_q, V_d)$ using cosine similarity. Based on the query and document, and machine learning model 900 labels the pair as similar (positive pair, y=1) or dissimilar (negative pair, y=0). The contrastive loss can be represented as follows:

$$L_{con}(q, d, y) = yD^2(V_q, V_d) + (1-y)\max(0, m - D(V_q, V_d))^2 \quad (1)$$

where m is a margin that represents how far apart is the dissimilar pair. Additionally, a batch size of 16 and a learning rate of 2e−5 are applied when training semantic search model 905.

According to some embodiments, reasoning model 910 is fine-tuned based on reasoning fine-tuning 925. For example, reasoning fine-tuning includes cross-entropy loss and annotation. For example, a cross-entropy loss function is applied to reasoning model 910 to predict whether a document answers the query. Given a data sample, $y_{ic}$ that represents the ground-truth reasoning result for a prompt P and $\hat{y}_{ic}$ that represents the predicted reasoning result, the cross-entropy loss for reasoning model 910 can be represented as:

$$L_{ce}(P, y_{ic}, \hat{y}_{ic}) = -y_{ic}\log(\hat{y}_{ic}) - (1 - y_{ic})\log(1 - \hat{y}_{ic}). \quad (2)$$

Additionally, a batch size of 16 and a learning rate of 1e−5 are applied when training reasoning model 910.

According to some embodiments, ensemble model 915 is fine-tuned based on ensemble fine-tuning 930. For example, ensemble fine-tuning includes a grid search and annotation. For example, the grid search is a weight search (within [0,1]) of semantic search model 905, reasoning model 910, and rule-based model.

Accordingly, by applying the fine-tuning method of the present disclosure, machine learning model 900 is able to accurately retrieve a document that answers the query. Additionally, embodiments of the present disclosure increase the performance of document retrieval. Evaluation on based on machine learning model 900 is described with reference to FIG. 10.

Machine learning model 900 is an example of, or includes aspects of, the corresponding element described with reference to FIGS. 5 and 6. Semantic search model 905 is an example of, or includes aspects of, the corresponding element described with reference to FIGS. 5 and 6. Reasoning model 910 is an example of, or includes aspects of, the corresponding element described with reference to FIGS. 3, 5, and 6. Ensemble model 915 is an example of, or includes aspects of, the corresponding element described with reference to FIGS. 5 and 6.

FIG. 10 shows an example of an evaluation based on the machine learning model according to aspects of the present disclosure. The example shown includes table 1000. Machine learning model is an example of, or includes aspects of, the corresponding element described with reference to FIGS. 5, 6, and 9.

In one embodiment, the machine learning model of the present disclosure has been validated using data from a customer experience platform such as Adobe® Experience Platform (AEP). For example, real-world and queries from AEP products are used to evaluate the machine learning model of the present disclosure. In some examples, the evaluated dataset includes 1540 question-documents pairs. Each question includes 10 annotated documents, where each document has a score ranging in {0, 1, 2, 3}. Additionally, each question has at least one document with a score of 3.

Each score indicates a level of whether a document answers or is relevant to the query. For example, a score of "0" indicates an uncertainty that the document or a snippet of the document answers or relates to the query. A score of "1" indicates the document does not answer or relate to the query. The document does not contain useful information about the query. A score of "2" indicates the document partially answers the query and provides a partial amount of relevant information, however, the document might not be comprehensive or satisfactory. In some cases, additional documents are needed. A score of "3" indicates the document answers the query and provides necessary information and useful context.

Table 1000 illustrates the evaluation of five embodiments according to the present disclosure. The first embodiment includes a semantic search model without fine-tuning. The second embodiment includes a semantic search model with fine-tuning. The third embodiment includes a reasoning model. The fourth embodiment includes a reasoning model and a semantic model with fine-tuning. Lastly, the fifth embodiment includes a reasoning model, a semantic search model, and a rule-based model with fine-tuning.

According to some embodiments, the data is randomly split into training and testing data (with a 1:1 ratio) five times to avoid bias in the evaluation process. In some cases, the data is split in a question-wise way. For example, when a question appears in the testing data, the question is omitted in the training data. In some cases, similar data distributions of different question types in the training data and testing data are maintained to cover representative and diverse types of questions during testing.

Based on the evaluation, table 1000 illustrates first, by fine-tuning the semantic search model, the semantic search model is able to increase the performance in document retrieval. Second, by applying the reasoning model, the performance is increased compared to when applying semantic search model without fine-tuning. Third, the performance is increased when a semantic search model and a reasoning model are used. Lastly, by combining a semantic search model, a reasoning model, and a rule-based model along with fine-tuning, the embodiment of the present disclosure is able to increase the performance and accuracy in document retrieval. In some cases, fine-tuning based on the training data that covers diverse types of questions, the generalization ability of the machine learning model is increased.

Computing Device

Figure 11:
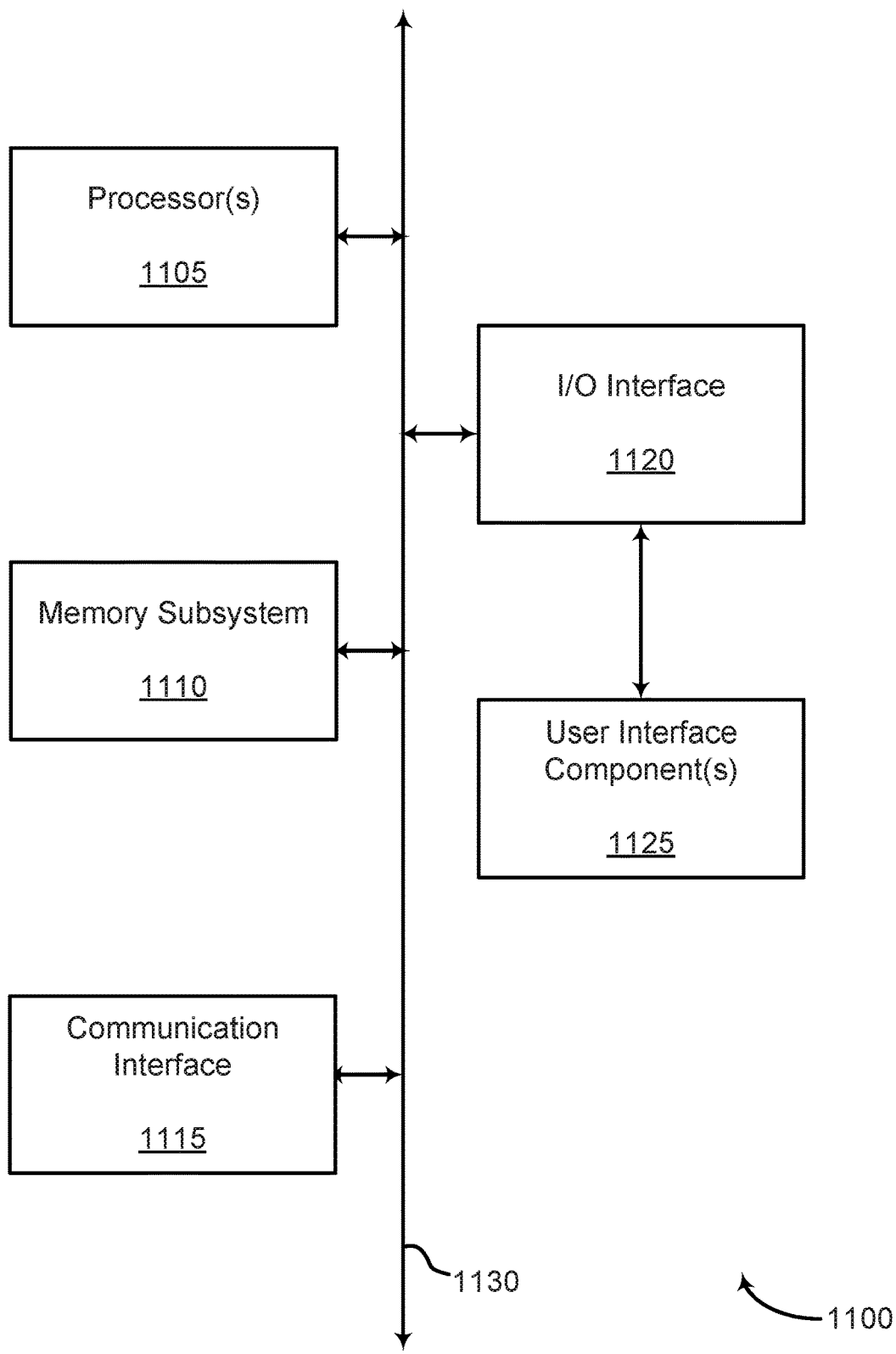
FIG. 11 shows an example of a computing device according to aspects of the present disclosure.

FIG. 11 shows an example of a computing device 1100 according to aspects of the present disclosure. The example shown includes computing device 1100, processor(s), memory subsystem 1110, communication interface 1115, I/O interface 1120, user interface component(s), and channel 1130.

In some embodiments, computing device 1100 is an example of, or includes aspects of, the document retrieval apparatus described with reference to FIGS. 1 and 5. In some embodiments, computing device 1100 includes one or more processors 1105 that can execute instructions stored in memory subsystem 1110 to obtain a query and a document; generate a prompt for a reasoning model based on the query and the document; generate a reasoning result based on the prompt, wherein the reasoning result indicates that the document answers the query; and provide the document in response to the query based on the reasoning result.

According to some embodiments, computing device 1100 includes one or more processors 1105. In some cases, a processor is an intelligent hardware device, (e.g., a general-purpose processing component, a digital signal processor (DSP), a central processing unit (CPU), a graphics processing unit (GPU), a microcontroller, an application-specific integrated circuit (ASIC), a field programmable gate array (FPGA), a programmable logic device, a discrete gate or transistor logic component, a discrete hardware component, or a combination thereof. In some cases, a processor is configured to operate a memory array using a memory controller. In other cases, a memory controller is integrated into a processor. In some cases, a processor is configured to execute computer-readable instructions stored in a memory to perform various functions. In some embodiments, a processor includes special-purpose components for modem processing, baseband processing, digital signal processing, or transmission processing. Processor(s) 1105 is an example of, or includes aspects of, the processor unit described with reference to FIG. 5.

According to some embodiments, memory subsystem 1110 includes one or more memory devices. Examples of a memory device include random access memory (RAM), read-only memory (ROM), or a hard disk. Examples of memory devices include solid-state memory and a hard disk drive. In some examples, memory is used to store computer-readable, computer-executable software including instructions that, when executed, cause a processor to perform various functions described herein. In some cases, the memory contains, among other things, a basic input/output system (BIOS) that controls basic hardware or software operations such as the interaction with peripheral components or devices. In some cases, a memory controller operates memory cells. For example, the memory controller can include a row decoder, column decoder, or both. In some cases, memory cells within a memory store information in the form of a logical state. Memory subsystem 1110 is an example of, or includes aspects of, the memory unit described with reference to FIG. 5.

According to some embodiments, communication interface 1115 operates at a boundary between communicating entities (such as computing device 1100, one or more user devices, a cloud, and one or more databases) and channel 1130 and can record and process communications. In some cases, communication interface 1115 is provided to enable a processing system coupled to a transceiver (e.g., a transmitter and/or a receiver). In some examples, the transceiver is configured to transmit (or send) and receive signals for a communications device via an antenna. In some cases, a bus is used in communication interface 1115.

According to some embodiments, I/O interface 1120 is controlled by an I/O controller to manage input and output signals for computing device 1100. In some cases, I/O interface 1120 manages peripherals not integrated into computing device 1100. In some cases, I/O interface 1120 represents a physical connection or port to an external peripheral. In some cases, the I/O controller uses an operating system such as iOS®, ANDROID®, MS-DOS®, MS-WINDOWS®, OS/2®, UNIX®, LINUX®, or other known operating system. In some cases, the I/O controller represents or interacts with a modem, a keyboard, a mouse, a touchscreen, or a similar device. In some cases, the I/O controller is implemented as a component of a processor. In some cases, a user interacts with a device via I/O interface 1120 or hardware components controlled by the I/O controller.

According to some embodiments, user interface component(s) 1125 enables a user to interact with computing device 1100. In some cases, user interface component(s) 1125 include an audio device, such as an external speaker system, an external display device such as a display screen, an input device (e.g., a remote-control device interfaced with a user interface directly or through the I/O controller), or a combination thereof.

The performance of apparatus, systems and methods of the present disclosure have been evaluated, and results indicate embodiments of the present disclosure have obtained increased performance over existing technology (e.g., document retrieval models). Example experiments demonstrate that the machine learning model based on the present disclosure outperforms conventional image detectors. Details on the performance based on embodiments of the present disclosure are described with reference to FIG. 10.

The description and drawings described herein represent example configurations and do not represent all the implementations within the scope of the claims. For example, the operations and steps can be rearranged, combined, or otherwise modified. Also, structures and devices can be represented in the form of block diagrams to represent the relationship between components and avoid obscuring the described concepts. Similar components or features can have the same name but can have different reference numbers corresponding to different figures.

Some modifications to the disclosure can be readily apparent to those skilled in the art, and the principles defined herein can be applied to other variations without departing from the scope of the disclosure. Thus, the disclosure is not limited to the examples and designs described herein, but is to be accorded the broadest scope consistent with the principles and novel features disclosed herein.

The described methods can be implemented or performed by devices that include a general-purpose processor, a digital signal processor (DSP), an application specific integrated circuit (ASIC), a field programmable gate array (FPGA) or other programmable logic device, discrete gate or transistor logic, discrete hardware components, or any combination thereof. A general-purpose processor can be a microprocessor, a conventional processor, controller, microcontroller, or state machine. A processor can also be implemented as a combination of computing devices (e.g., a combination of a DSP and a microprocessor, multiple microprocessors, one or more microprocessors in conjunction with a DSP core, or any other such configuration). Thus, the functions described herein can be implemented in hardware or software and can be executed by a processor, firmware, or any combination thereof. If implemented in software executed by a processor, the functions can be stored in the form of instructions or code on a computer-readable medium.

Computer-readable media includes both non-transitory computer storage media and communication media including any medium that facilitates transfer of code or data. A non-transitory storage medium can be any available medium that can be accessed by a computer. For example, non-transitory computer-readable media can comprise random access memory (RAM), read-only memory (ROM), electrically erasable programmable read-only memory (EEPROM), compact disk (CD) or other optical disk storage, magnetic disk storage, or any other non-transitory medium for carrying or storing data or code.

Also, connecting components can be properly termed computer-readable media. For example, if code or data is transmitted from a website, server, or other remote source using a coaxial cable, fiber optic cable, twisted pair, digital subscriber line (DSL), or wireless technology such as infrared, radio, or microwave signals, then the coaxial cable, fiber optic cable, twisted pair, DSL, or wireless technology are included in the definition of medium. Combinations of media are also included within the scope of computer-readable media.

In this disclosure and the following claims, the word "or" indicates an inclusive list such that, for example, the list of X, Y, or Z means X or Y or Z or XY or XZ or YZ or XYZ. Also the phrase "based on" is not used to represent a closed set of conditions. For example, a step that is described as "based on condition A" can be based on both condition A and condition B. In other words, the phrase "based on" shall be construed to mean "based at least in part on." Also, the words "a" or "an" indicate "at least one."

What is claimed is:

1. A method of document retrieval, comprising:
   obtaining a query to a database and a document from the database;
   generating, using a prompt generator, a prompt for a reasoning model based on the query and the document;
   generating, using the reasoning model, a reasoning result by performing a self-attention mechanism on the prompt, wherein the reasoning result indicates that the document answers the query based on a query-document contrastive learning loss computed using a positive query-document pair and a negative query-document pair, the positive query-document pair includes a first query and a first document that includes enough information to answer the first query, and the negative query-document pair includes a second query and a second document that does not include enough information to answer the second query; and
   providing the document from the database in response to the query based on the reasoning result.

2. The method of claim 1, wherein obtaining the document comprises:
   generating, using a semantic search model, a query embedding based on the query;
   ranking, using the semantic search model, a plurality of documents based on the query embedding to obtain a ranking result; and
   selecting, using the semantic search model, the document from the plurality of documents based on the ranking result.

3. The method of claim 2, wherein:
   computing a document embedding based on the document; and
   comparing the query embedding to the document embedding, wherein the ranking is based on the comparison.

4. The method of claim 2, further comprising:
   combining, using an ensemble model, the reasoning result and the ranking result to obtain a selection result, wherein the document is provided based on the selection result.

5. The method of claim 4, further comprising:
   evaluating, using a rule-based model, the document to obtain a rule-based result, wherein the selection result is based at least in part on the rule-based result.

6. The method of claim 1, wherein generating the prompt further comprises:
   formulating the prompt as a multiple-choice question.

7. The method of claim 1, wherein obtaining the document comprises:
   retrieving a plurality of documents from the database, wherein the document is selected from the plurality of documents based on the reasoning result.

8. An apparatus, comprising:
   at least one processor;
   at least one memory including instructions executable by the at least one processor;

a prompt generator comprising parameters stored in the at least one memory, wherein the prompt generator is trained to generate a prompt based on a query and a document; and a reasoning model comprising parameters stored in the at least one memory, wherein the reasoning model is trained to output a reasoning result by performing a self-attention mechanism on the prompt, and wherein the reasoning result indicates that the document answers the query based on a query-document contrastive learning loss computed using a positive query-document pair and a negative query-document pair, the positive query-document pair includes a first query and a first document that includes enough information to answer the first query, and the negative query-document pair includes a second query and a second document that does not include enough information to answer the second query.

9. The apparatus of claim 8, further comprising:
a semantic search model comprising parameters stored in the at least one memory, wherein the semantic search model is trained to output a ranking result based on the query and to rank a plurality of documents based on the ranking result.

10. The apparatus of claim 9, further comprising:
an ensemble model comprising parameters stored in the at least one memory, wherein the ensemble model is trained to combine the ranking result and the reasoning result.

11. The apparatus of claim 8, further comprising:
a rule-based model comprising parameters stored in the at least one memory, wherein the rule-based model is configured to output a rule-based result based on the document.

12. The apparatus of claim 8, wherein:
the reasoning model comprises a large language model (LLM).

13. The apparatus of claim 12, wherein:
the reasoning model comprises a transformer model.

14. The apparatus of claim 8, further comprising:
a database storing a plurality of documents.

* * * * *